N. R. DARRAGH.
ANIMAL SMOKER.
APPLICATION FILED JULY 5, 1917.
1,262,649.
Patented Apr. 16, 1918.
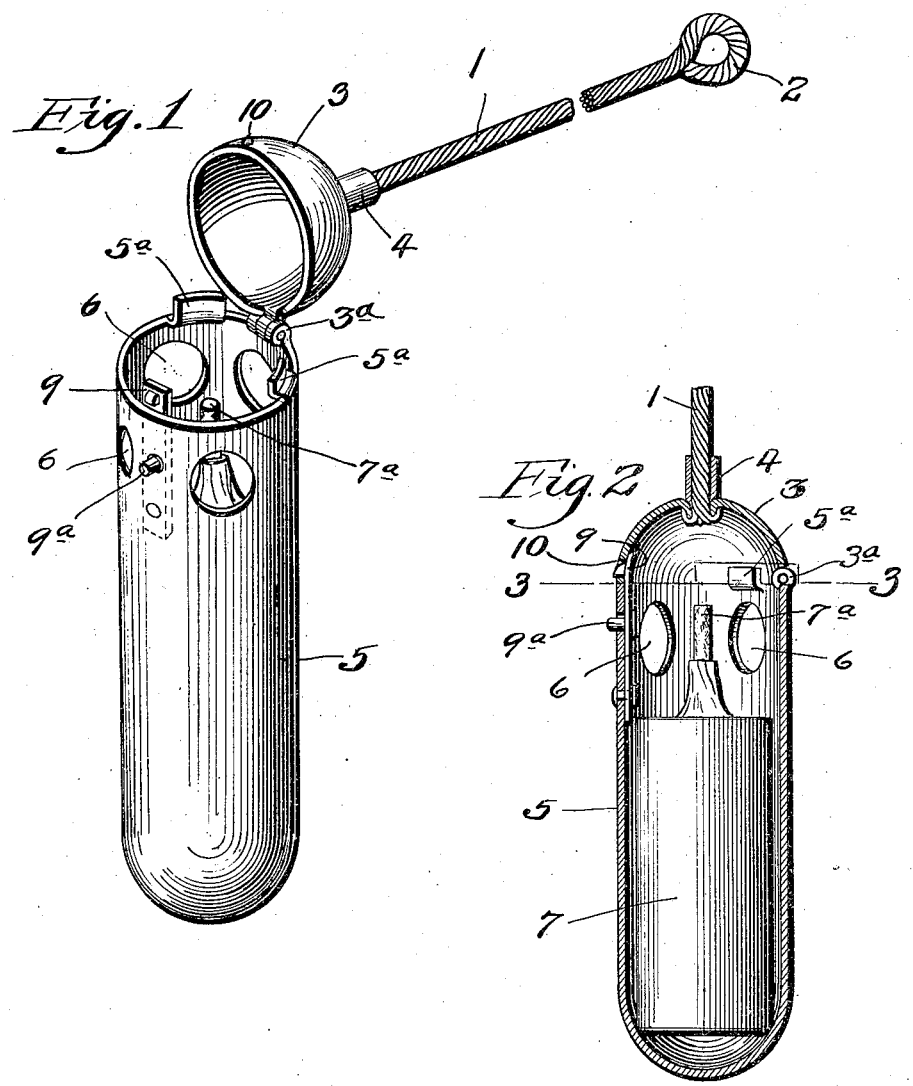
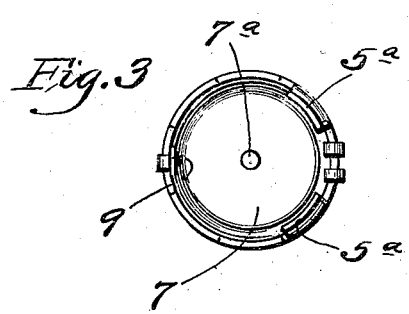
Inventor
Nelson R. Darragh
By T. A. Cornwall, Atty.

UNITED STATES PATENT OFFICE.

NELSON R. DARRAGH, OF ST. LOUIS, MISSOURI.

ANIMAL-SMOKER.

1,262,649.

Specification of Letters Patent.

Patented Apr. 16, 1918.

Application filed July 5, 1917. Serial No. 178,678.

*To all whom it may concern:*

Be it known that I, NELSON R. DARRAGH, a citizen of the United States, residing at the city of St. Louis, State of Missouri, have invented a certain new and useful Improvement in Animal-Smokers, of which the following is a full, clear, and exact description, such as will enable others skilled in the art to which it appertains to make and use the same, reference being had to the accompanying drawings, forming part of this specification, in which—

Figure 1 is a detail view of my improved animal smoker.

Fig. 2 is a sectional view of the same.

Fig. 3 is a cross sectional view on line 3—3 of Fig. 2.

This invention relates to a new and useful improvement in animal smokers, *i. e.*, a device which is introduced into the den of animals for the purpose of driving them out. Heretofore, smudge fires have been built at the opening of the den or a smoke cartridge lighted and the smoke forced into the den by any convenient means. My invention contemplates the use of a retrievable cartridge holder which is dropped into the den by the operator, or which may be thrown into the den and which will burn a sufficient length of time to partially suffocate the animal and drive it out.

In the drawings 1 indicates a cable of desired flexibility and length, said cable having a loop 2 at one extremity and being preferably made of wire strands which may be expanded or bent to provide an attachment into the cap or cover of the cartridge holder. This cap or cover, designated by the numeral 3, is provided at its top with a hollow boss 4 for receiving the end of the cable. 5 indicates the body of the cartridge holder preferably cylindrical in form and having a rounded lower end, which body is provided with openings 6 which are primarily intended for permitting the escape of the smoke arising from the combustion of the material contained within the body 5, and said openings being also for the purpose of admitting whatever air is necessary to support combustion of the combustible material. The combustible material is preferably in the form of a cartridge 7, one end of which is provided with a suitable fuse 7ᵃ which is lighted before the device is thrown into the den. The cap portion 3, above described, is preferably connected to the body portion by means of a hinge 3ᵃ and is supported against lateral displacement by means of lugs 5ᵃ, there being a latch in the form of a leaf spring 9 secured to the body portion and having a lug engaging recess 10 in the cap portion. A projection 9ᵃ on this leaf spring provides means for operating the latch to release the cap or cover.

I am aware that the embodiment of my invention herein described is susceptible of modifications and variations without departing from the scope of the invention as indicated in the following claim.

I claim:

A device of the class described comprising an elongated hollow body having a smooth external surface, the lower end of said body being rounded and imperforate, there being series of openings formed through the upper portion of said body, inwardly and upwardly projecting ears integral with the upper end of said body, a rounded cover hinged to the upper end of said body, the edge of which cover is adapted to overlie the ears on the body of the device, a latch for holding the cover in closed position on the body, and a flexible cable secured to the central portion of said rounded cover.

In testimony whereof I hereunto affix my signature this 27th day of June, 1917.

NELSON R. DARRAGH.

Copies of this patent may be obtained for five cents each, by addressing the "Commissioner of Patents, Washington, D. C."